SOLID STATE HEARING SYSTEM

Filed Oct. 23, 1962

INVENTORS
HENRY K. PUHARICH
JOSEPH L. LAWRENCE
BY
Mandeville & Schweitzer
ATTORNEYS 3,156,787
Patented Nov. 10, 1964

3,156,787

SOLID STATE HEARING SYSTEM

Henry K. Puharich, 87 Hawkes Ave., Ossining, N.Y., and Joseph L. Lawrence, 570 Fort Washington Ave., New York, N.Y.

Filed Oct. 23, 1962, Ser. No. 232,390
8 Claims. (Cl. 179—107)

The present invention relates to electronic hearing systems arranged for direct application to the nervous system of the human body, and is directed more particularly to specific improvement in the hearing system described and claimed in our prior United States Patent No. 2,995,633, granted August 8, 1961.

In the novel hearing system described and claimed in our before-mentioned patent, the sensation of hearing is induced in a human subject by applying modulated electrical signals to viable nerves of the facial system of the human subject, the "facial system" being a relatively specific network of nerves confined to facial areas of the human body and defined in more precise detail in our patent. The present invention, as its primary objective, provides an improved, highly simplified and wholly effective arrangement of physical and electrical components, enabling the system of our prior patent to be carried out in a highly reliable manner, at a minimum of cost and with components of minimum physical bulk.

A basic discovery incorporated in the system of our prior Patent No. 2,995,633 resides in the fact that modulated electromagnetic (i.e., radio) signals, when applied directly to the viable nerves of the facial system, can be converted to proper modulated electric signals which create a sensation of hearing in the human subject. In a most practical system for imparting the desired, modulated signals to the subject, an appliance is mounted on a viable tooth of the subject to receive transmitted radio input signals, convert them to usable form and apply the usable signals to the viable nerves of the tooth. In accordance with the present invention, an extremely simplified, reliable and economical appliance is provided for this purpose, which comprises essentially a piezoelectric crystal element, tuned sharply to the carrier frequency of the radio transmitter and connected to the negative terminal of a detector diode. This appliance is attached to the body of the subject in such away that viable nerves of the facial system of the user are connected through one plate of the crystal to the negative terminal of the diode. The positive terminal of the diode is connected to the body of the subject in such a way as to complete an electrical circuit, through the nerve system of the subject, to the other plate of the crystal. The positive terminal of the diode need not necessarily be connected directly to an area of the facial nerve system of the subject, but it is advantageous to so connect the appliance, both for practical, physical reasons, and for most efficient performance.

In one of its advantageous forms, the appliance of the invention takes the form of a double-tooth bridge, which caps adjacent, denuded viable teeth of the subject, with connections being made to the viable nerves of each tooth to complete the desired circuit arrangements. In a second advantageous form, the appliance takes the form of a single tooth cap, with the terminals of the electrical components being connected at one side to viable nerves of the tooth and at the other side to viable nerves of other areas of the facial system, such as the tongue.

As a particularly advantageous aspect of the invention, the essential components of the appliance, namely, a tuned piezoelectric crystal and a simple diode, are arranged in a wafer-like arrangement of a practical minimum physical size, suitable for association with the teeth of a human subject.

In another specific, advantageous form of the invention, a second piezoelectric crystal element having a resonance in the audio frequency range, is electrically coupled to the positive terminal of the diode and arranged in physical and electrical contact with viable nerves of the facial system of the subject, in such a way that the electrical signals imparted to the nerves are accompanied by physical stimulation of the nerves for improved receptivity.

For a better understanding of the invention, reference should be made to the following detailed description and to the accompanying drawing, in which.

Figures 1, 2, 3:
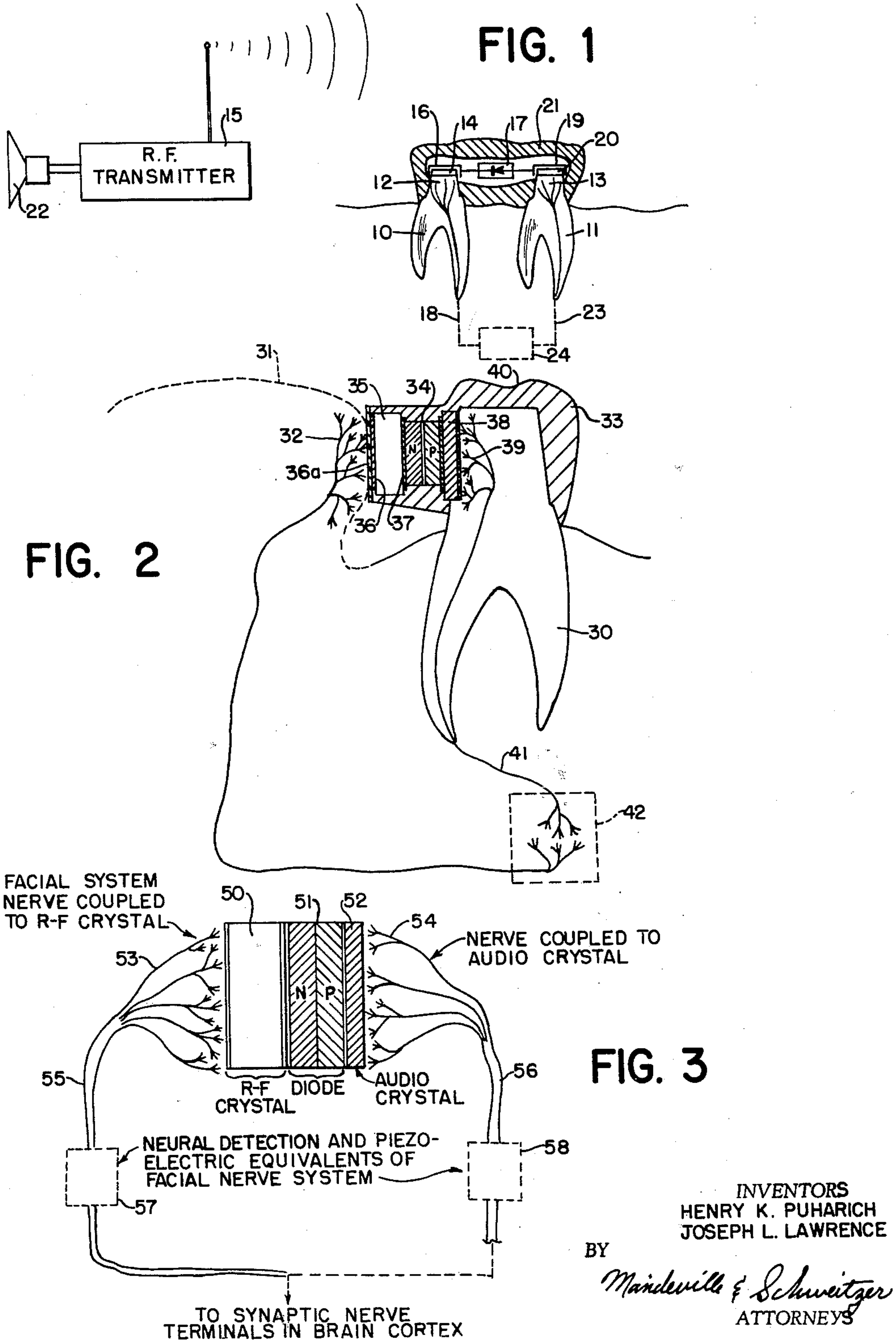
FIG. 1 is a simplified, schematic representation of one form of the invention.
FIG. 2 is a simplified, schematic representation of a second form of the invention.
FIG. 3 is a schematic representation of the theorized circuit networks involved in the systems of FIGS. 1 and 2.

Referring now to the drawings, and initially to FIG. 1 thereof, the reference numerals 10, 11 designate viable teeth of a human subject which have been "denuded" by removal of their enamel covering and exposure of their respective nerve endings 12, 13.

In accordance with the invention, one of the denuded teeth, and specifically the tooth designated by the numeral 10 in the illustration of FIG. 1, has applied to the top thereof, in electrical and physical contact with the exposed nerve endings 12, a piezoelectric crystal element 14, which may be referred to herein as an R-F resonant crystal. The R-F resonant crystal 14, per se, may be of a conventional type, being advantageously formed of a lead zirconate titanate composition, polarized with its "plus" side against the nerve endings 12. Further, the R-F resonant crystal 14 is designed to be resonant over a predetermined, limited range of frequencies substantially inclusive of the carrier frequencies of a radio transmitter 15 associated near the body of the subject. Thus, for association with a typical R-F transmitter 15 having a carrier frequency on the order of four megacycles, the R-F resonant crystal 14 advantageously is tuned for resonance at or near four megacycles.

Connected to the R-F resonant crystal 14, advantageously by a metal conductor plate 16, is a diode 17, which may be a simple semi-conductor device for the detection of modulated alternating signals. In this respect, the term "diode" is not intended to be used in a limiting sense, but only to describe a non-linear element which performs a detecting and rectifying function.

In accordance with one aspect of the invention, the diode 17 has its negative terminal connected to the R-F resonant crystal 14 through the conductive plate 16. Thus, where the diode 17 is a simple semi-conductor device, having a single P-N junction, the N side of the semiconductor is connected to the R-F resonant crystal. The positive or P side of the diode is, in accordance with the invention, connected to the body of the subject in such a way as to complete an electrical circuit back to the nerve system 18 serving the denuded tooth 10. While this circuit connection may be accomplished through various areas of the body (e.g., a finger) the connection advantageously is made to an adjacent, denuded tooth 11, substantially as shown in FIG. 1.

In the specific system illustrated in FIG. 1, the connection of the positive terminal of the diode 17 to the denuded tooth 11 is made through a conductive plate 19 and a piezoelectric crystal 20, the latter being in direct contact with the exposed nerve endings 13 of the tooth. The crystal element 20, while not necessary in a theoretical sense, is advantageous in that the application of electrical signals to the viable nerve endings 13 is accompanied by physical vibratory stimulation of the nerve endings, which improves their receptivity to the electrical signals. Advantageously, the crystal element 20 is formed of a barium titanate material and is designed to be resonant at frequencies substantially inclusive of the audible frequency range.

In the system of FIG. 1, the pair of denuded, viable teeth 10, 11 advantageously are chosen to be located in side-by-side relation, so that both can be enclosed and protected by a bridge housing 21 in the form of a double dental cap.

In the operation of the system of FIG. 1, the R-F transmitter 15 is positioned adjacent the body of the subject (e.g., in a shirt pocket) and is activated by sounds directed into a microphone 22. The transmitted energy of the R-F transmitter 15, being radiated at a specific carrier frequency or specific range of carrier frequencies, is received by the tuned system, including the tuned crystal 14. These signals are appropriately detected by the diode 17 and applied to viable nerves of the facial system, particularly through the nerve endings 12 of the denuded tooth 10, the circuit being completed through the nerve system 18 directly serving the tooth 10, a nerve system 23 directly serving the tooth 11, and additional nervous and other elements of the body, indicated generally by the reference numeral 24. As explained in our Patent No. 2,995,633, the signals so imparted to the facial nervous system of the subject are transmitted to the neural components of the auditory mechanism and to the brain of the subject, substantially by-passing at least the mechanical components of the ear system, and result in a faithful sensation of sound corresponding to that received by the microphone 22.

In the modified system of FIG. 2, a particularly simplified and compact appliance is mounted on a single viable tooth 30 of the subject, in an arrangement providing for completion of the necessary electrical circuits through facial system nerves apart from the teeth of the subject. Specifically, the system of FIG. 2 is adapted to utilize the nerves of the subject's tongue 31, it being known that at least certain nerves 32 of the tongue form part of the facial system.

In the device of FIG. 2, which is greatly exaggerated in size to facilitate description, a dental cap 33 is received over the viable, denuded tooth 30 and has embedded therein a plurality of electrical components for receiving electromagnetic transmission within a predetermined range of carrier frequencies. Thus, a diode element 34, advantageously a wafer-like semi-conductor having N and P sides as indicated, is mounted with its N side in electrical contact with an R-F resonant crystal 35 formed of piezoelectric material and tuned to the carrier frequency range of the transmitter, which may be on the order of four megacycles, for example. Advantageously, the R-F resonant crystal 35 has metal terminals 36, 37 plated on its opposite sides, the terminal 37 providing electrical contact between the crystal and the semi-conductor diode 34, and the terminal 36 being exposed along an open side of the cap 33 for physical and electrical contact with the tongue 31, as will be explained.

Advantageously, although not necessarily, a second piezoelectric crystal 38, with plated terminals on its opposite sides, is affixed at one side to the P side of the semi-conductor diode and is held in contact along its other side with viable nerves 9 of the tooth 30, which have been exposed by denuding of the tooth.

The entire assembly of the FIG. 2 system, including the crystals 35, 38 and the diode 34, advantageously is of wafer-thin construction, so as to be unobtrusively concealed with the cap 33. Additionally, the various components are mounted by the cap 33 in offset relation to working surface areas 40 thereof, so that vertical pressures applied to the cap are not transmitted through the circuit elements.

In the system of FIG. 2, the exposed terminal 36 of the R-F resonant crystal 35, which is, advantageously, the "plus" terminal, is arranged to be contacted by the tongue 31 of the subject, so as to be electrically connected to viable nerves 32 serving the tongue and forming part of the facial system of the subject. Thus, when the tongue is pressed against the terminal 36 an operative circuit is completed through the tongue nerves 32, and the nerve system 41 directly serving the tooth 30, through nervous and other circuit elements of the body, generally indicated by the numeral 42. It has been found desirable in certain applications to cover the exposed terminal 36, with an insulating film 36*a* (polyester film being an example) in order to have correct matching impedance between the tongue tissue and the circuit element 35. As will be understood, the system of FIG. 2 includes the various circuit elements described in connection with the system of FIG. 1, and is operative to receive transmitted electromagnetic energy and apply such energy, in a properly converted form, to the facial system nerves of the subject, particularly the nerves 32 of the tongue, to impart a sensation of sound to the brain of the subject, substantially in the manner more broadly outlined in our prior United States Patent No. 2,995,633.

The simplified representation of FIG. 3 illustrates in a schematic way, the various circuit elements involved in the system of the present invention and utilized specifically in the described systems of FIGS. 1 and 2. Specifically, the external or "artificial" elements of the system include, in series, an R-F resonant crystal 50, a simple semi-conductor detector diode 51 with its N side connected to the R-F resonant crystal, and an audio resonant crystal 52 connected to the P side of the diode, it being understood, however, that the audio crystal 52 is advantageous but not critical in the system. As indicated in FIG. 3, the R-F crystal 50 is coupled to viable nerves 53 of the facial system of the subject, while the audio crystal 52 is coupled with other viable nerves 54 of the subject, which advantageously but not necessarily are nerves of the facial system.

A complete electrical circuit is formed by the artificial elements 50–52, the nerve endings 53, 54 and the nerve systems 55, 56 serving the latter. In this respect, the skin, the mucous membranes, and the nerve elements of the body have been found to exhibit special circuit characteristics, including detection, piezoelectric qualities, as well as characteristics of capacitance, inductance and resistance. The exact circuit equivalents are not clearly known, and are indicated only in a general way by the reference numerals 57, 58. It is known, however, that a complete, operative circuit is formed, which serves to impart modulated electrical signals to synaptic nerve terminals in the brain cortex to accomplish, in the end, substantially what is accomplished in the normally functioning ear system of the human, but in a manner which substantially bypasses the ear system, or at least the mechanically involved regions thereof, so that normal sensations of hearing can be developed in a human subject whose mechanical hearing facilities are inoperative.

The improvements of the present invention constitute a substantial specific advance in the perfection of our previously patented system, in the sense that the physical elements required to be installed on the body are reduced to a practical minimum size and may be assembled and installed at an extremely reasonable cost, suitable for mass application to a large body of hearing loss patients. In this respect, it is contemplated further that the various components of the system of the invention may be further reduced, to micro-miniature proportions, through the use of so-called "thin film" circuit fabrication techniques. However, the present state of the art, with respect to thin film fabrication is such that signficant additonal costs are involved. Ultimately, the cost of the thin film fabrication is expected to be greatly reduced, and it is contemplated that such techniques will be employed in the practice of the invention as soon as the economies justify proceeding along those lines.

It should be understood that the specific forms of the invention herein illustrated and described are intended to be representative only, as certain variations may be made therein without departing from the clear teachings of the disclosure. Accordingly, reference should be made to the following appended claims in determining the full scope of the invention.

We claim:

1. In a hearing system of the type including a radio transmitter for converting audible signals into modulated electromagnetic signals and transmitting said electromagnetic signals on a predetermined range of carrier frequencies, and a reception system for receiving the transmitted electromagnetic signals, converting them to electrical signals and imparting the electrical signals to viable nerves of the facial nerve system of a human subject, the improvement characterized by said reception system comprising, (*a*) a piezoelectric radio frequency resonant crystal element arranged for electrical circuit connection with nerves of a first area of the facial system of the human subject, (*b*) said crystal having a predetermined resonant frequency range substantially inclusive of said predetermined range of said carrier frequencies, and (*c*) a diode having positive and negative terminals and having its negative terminal connected to said radio frequency resonant crystal, (*d*) said diode having its positive terminal arranged for circuit connection with nerves of a second area of said facial system.

2. The hearing system of claim 1 which includes, (*a*) a second piezoelectric crystal element connected in series between the positive terminal of said diode and the nerves of said second area, (*b*) said second crystal having a predetermined resonant frequency range substantially inclusive of the range of frequencies audible to a human subject.

3. The hearing system of claim 1, in which, (*a*) said radio frequency resonant crystal is adapted for mounting on a first tooth of the subject, in electrical contact with viable nerves of said tooth, and (*b*) means are provided for electrically connecting the positive terminal of said diode to viable nerves of a second tooth of the subject.

4. The hearing system of claim 3, in which, (*a*) the means for connecting comprises a second piezoelectric element adapted to be mounted on said second tooth, in electrical contact with viable nerves thereof, (*b*) said second crystal having a predetermined resonant frequency range substantially inclusive of the range of frequencies audible to a human subject.

5. The hearing system of claim 3, in which, (*a*) said radio frequency resonant crystal and diode are enclosed within a housing, and (*b*) said housing is in the form of an artificial denture forming caps for said first and second teeth.

6. The hearing system of claim 1, in which, (*a*) means are provided for mounting one of said radio frequency resonant crystal and diode elements in electric circuit contact with viable nerves of a denuded tooth of the subject, and (*b*) the other of said elements is mounted by said means within the oral cavity of the subject and in position to be electrically coupled with the tongue of the subject.

7. The hearing system of claim 6, in which, (*a*) said means for mounting comprise a dental cap received on said tooth and mounting said one element in contact with a side wall portion of said denuded tooth, (*b*) said dental cap substantially enclosing said elements and providing an exposure opening for said other element, (*c*) said dental cap having working areas, and (*d*) said radio frequency resonant crystal and said diode being mounted by said dental cap in offset relation to said working areas.

8. In a hearing system of the type including a radio transmitter for converting audible signals into modulated electromagnetic signals and transmitting said electromagnetic signals on a predetermined range of carrier frequencies, and a reception system for receiving the transmitted electromagnetic signals, converting them to electrical signals and imparting the electrical signals to viable nerves of the facial nerve system of a human subject, the improvement characterized by said reception system comprising, (*a*) a piezoelectric radio frequency resonant crystal element arranged for electrical circuit connection with viable nerves of the facial system of a human subject, (*b*) said radio frequency resonant crystal having a predetermined resonant frequency range substantially inclusive of said predetermined range of said carrier frequencies, and (*c*) a diode having positive and negative terminals and having its negative terminal connected to said detector crystal, (*d*) said diode having its positive terminal arranged for electrical circuit connection with the body of the subject.

No references cited.